United States Patent [19]

United States Patent [19]

Bowe et al.

[11] Patent Number: 4,585,622
[45] Date of Patent: Apr. 29, 1986

[54] CHEMICAL MICROREACTOR HAVING CLOSE TEMPERATURE CONTROL

[75] Inventors: Woodford A. Bowe, Rising Sun, Md.; Robert Largione, Christiana; Eugene J. Levy, Oxford, both of Pa.

[73] Assignee: AE/CDS, Autoclave, Inc., Oxford, Pa.

[21] Appl. No.: 463,339

[22] Filed: Feb. 2, 1983

[51] Int. Cl.[4] .................... F28D 21/00; G01N 31/10; G05D 23/02
[52] U.S. Cl. ........................................ 422/50; 165/61; 422/78; 422/199; 436/37
[58] Field of Search ............... 422/109, 119, 130, 177, 422/199, 202, 211, 205, 50, 68, 78, 99; 434/298; 165/30, 61; 436/34, 37

[56] References Cited

U.S. PATENT DOCUMENTS

| | | | |
|---|---|---|---|
| 1,839,738 | 1/1932 | Casale | 422/199 |
| 2,002,525 | 5/1935 | Cambron et al. | 422/199 X |
| 2,118,567 | 5/1938 | Milas et al. | 422/199 X |
| 2,222,623 | 11/1940 | Lassiat | 422/119 X |
| 2,408,282 | 9/1946 | Wolf | 422/211 X |
| 2,508,212 | 5/1950 | Ball | 165/61 X |
| 2,622,969 | 12/1952 | Deansly et al. | 422/211 X |
| 2,631,091 | 3/1953 | Kuentz et al. | 422/199 X |
| 2,683,652 | 7/1954 | Martin | 422/202 X |
| 2,706,620 | 4/1955 | Graves | 165/61 X |
| 2,717,198 | 9/1955 | Jones et al. | 422/199 X |
| 2,887,470 | 5/1959 | Muench et al. | 422/199 X |
| 3,028,470 | 4/1962 | Spracklen | 165/30 X |
| 3,057,183 | 10/1962 | Ford | 73/23.1 |
| 3,062,624 | 11/1962 | Peifer | 422/78 X |
| 3,156,734 | 11/1964 | Happel | 422/199 X |
| 3,271,116 | 9/1966 | Hazelton | 422/199 |
| 3,279,891 | 10/1966 | Wenzel | 422/199 |
| 3,414,382 | 12/1968 | Kapff et al. | 422/109 X |
| 3,667,914 | 6/1972 | Penquite | 436/37 |
| 3,787,481 | 1/1974 | Siclari et al. | 422/202 X |
| 4,234,543 | 11/1980 | Matovich | 422/109 |
| 4,272,488 | 6/1981 | Carman | 422/109 |
| 4,474,052 | 10/1984 | Bodurtha et al. | 73/35 |

Primary Examiner—Barry S. Richman
Assistant Examiner—Brion P. Heaney
Attorney, Agent, or Firm—Nelson E. Kimmelman

[57] ABSTRACT

A reactor tube of a microreactor assembly including a first central temperature sensor and a channel formed in its outer surface to circulate a coolant. A tightly fitting conductive core surrounds the cooling channel and is sealed to the reactor tube at both ends to confine the coolant except for inlet and outlet holes. Around that core a metallic tube is fitted having a longitudinal slot to which a second temperature sensor is fixed. A heating element to heat the tube and the reactor tube is disposed on the slotted tube and second sensor so that temperature changes on the outer wall of the reactor tube-core sub-assembly can be detected. Both the first and second temperature sensors are adapted to feed output signals to a controlling data processing unit.

8 Claims, 5 Drawing Figures

CHEMICAL MICROREACTOR HAVING CLOSE TEMPERATURE CONTROL

BACKGROUND OF THE INVENTION

1. Field of the Invention

This invention relates to chemical reacting apparatus and, in particular, to chemical microreactors for operation at tightly-controlled temperatures.

2. Prior Art

In chemical laboratories, it is often desired to employ microreactors to produce chemical reactions at predetermined temperatures of small quantities of reactants, sometimes involving catalysts. Small-sized reactions may be desirable for many reasons, e.g., one of the reactants might be a dangerous gas. Also, if only small amounts of the reactants or catalysts are available, it may be desired to test their properties before proceeding with their further development. The behavior of catalysts themselves under varying temperature conditions may be the object of the investigation and microreactors are valuable because they are more easily able to produce desired changes of temperature than larger test units are. Microreactors with their controlled volumes, rates of flow, and temperatures, are more suited to enable scale up of various production processes.

In the past, microreactors have included a central reactor tube disposed within a relatively massive metallic heat-conductive core for assisting in the production of even heating. The reactor tube and core were inserted in a protective outer heating jacket having a heating element fixed within it. If the heating jacket-coil sub-assembly had a sufficiently large central space, it enabled different-sized reactor tube-core sub-assemblies to be inserted therein. Such apparatus had the concomitant disadvantage that larger cores had higher thermal inertia, so that they made it more difficult to control the heat within the reactor tube itself sufficiently quickly. This could present quite a problem when there was a reaction within the reactor tube itself which was of the exothermic type. Sudden and much higher than anticipated temperatures in the reactor tube could destroy catalysts, for example, associated with the reaction.

With larger apparatus, overheating was sometimes prevented by putting cooling devices inside the reactor tube itself. With microreactors, this was a physical impossibility.

It is, therefore, among the objects of the present invention to provide a microreactor assembly which:

1. Is small enough to test small amounts of substances.
2. Has provision for regulating the temperature within the reactor tube within tightly-controlled limits.
3. Can effect changes of temperature in a reactor tube at high rates of speed.
4. Facilitates accurate scale-up of the reaction under study.

In accordance with the present invention, these and other objects are attained by a microreactor assembly in which first and second sensing means are provided for measuring the respective temperatures within the reactor tube and in the region immediately adjacent its outer wall. Cooling means including a core of low thermal inertia are provided contiguous with the outer wall and heating means surround the cooling means. The heat sensing elements are adapted to be coupled to data processing units which can activate or inactivate, as the case may be, the heating and cooling means as a function of the sensed temperatures.

BRIEF SUMMARY OF THE INVENTION

Microreactor apparatus having a reactor tube, means for heating and cooling the reactor tube and means within and without the reactor tube for sensing temperature changes, the external sensing means being disposed in heat-conductive relation to both the heating and cooling means.

DETAILED DESCRIPTION OF THE DRAWINGS

Figure 1:
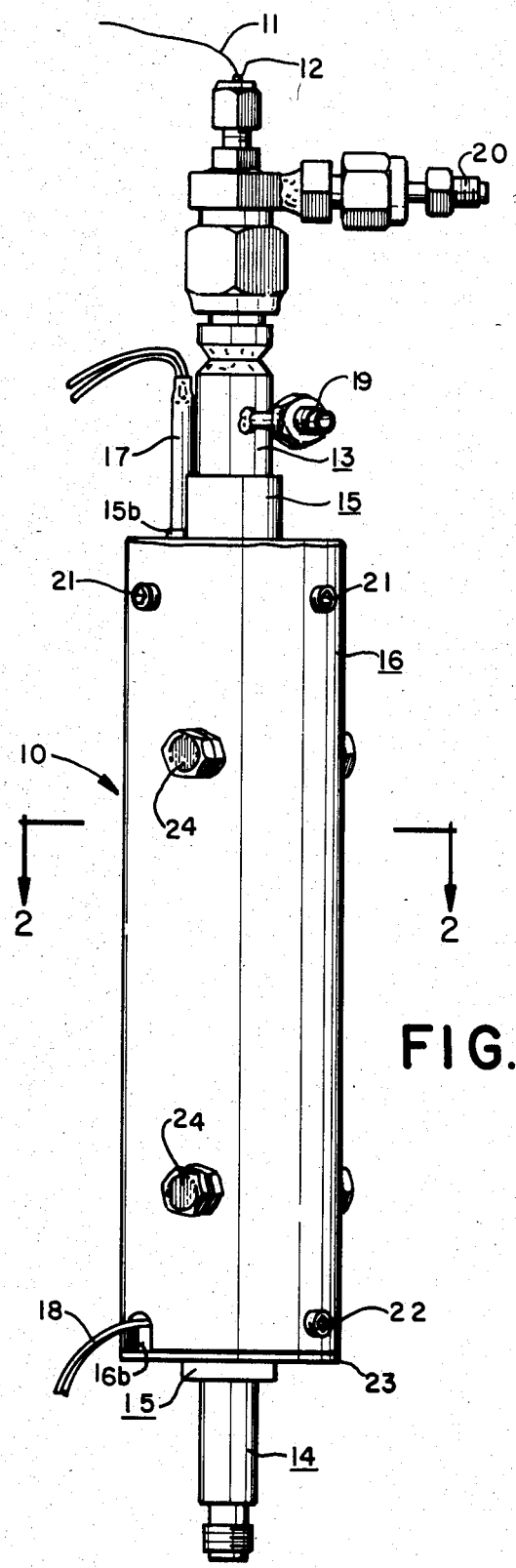
FIG. 1 is a side-elevation view of the complete microreactor assembly.
Figure 2:
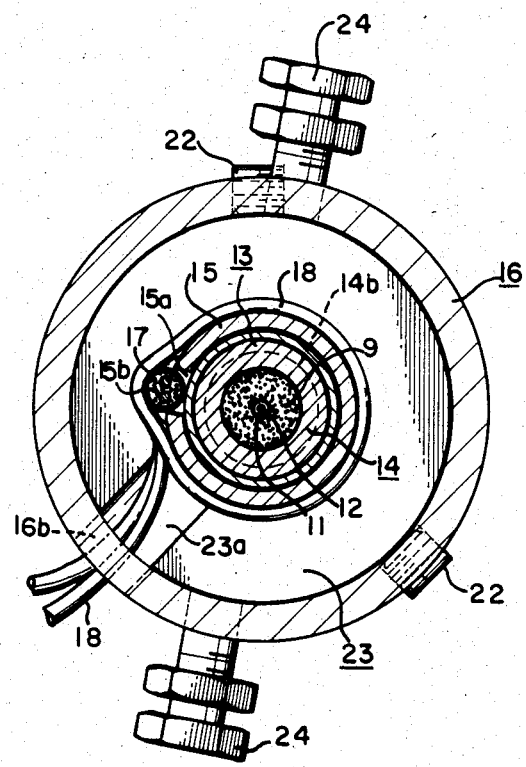
FIG. 2 is a sectional view taken along the section line 2—2 of FIG. 1 in the direction indicated.
Figure 3:
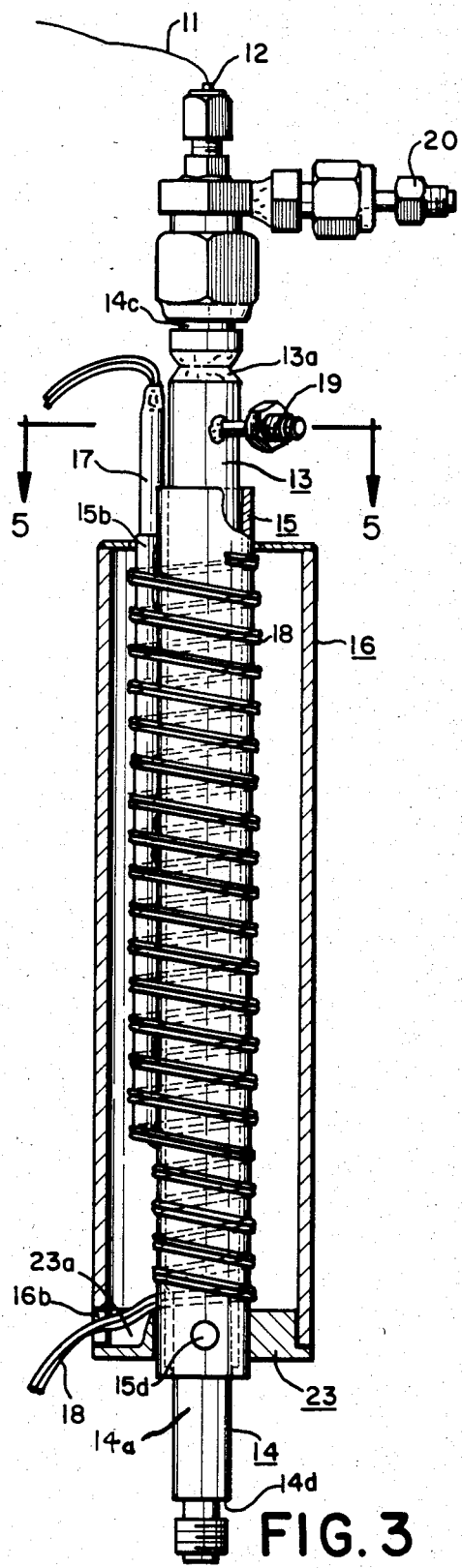
FIG. 3 is a side elevation view, partly in section and partly broken-away, showing more details of the inner construction.

Referring now to FIGS. 1-5, a microreactor assembly is shown generally at the numeral 10. Beginning from the inside out, there is a reactor tube 14 shown as being metallic, in the middle of which a small metallic tube 12 is axially disposed. A thermocouple 11 is located in tube 12 and may be moved to any desired position within the tube 12 to permit monitoring the temperature of the reactor tube in any interior region. The wire for the thermocouple is also shown which may be coupled to a central control or data processing unit (not shown). A tubular core 13 made of stainless steel, for example, surrounds a predetermined length of the tube 14 and is sealed at its ends 13a, 13b (FIGS. 3,4) as by welding to the external surface 14a of the reactor tube. Within the confines of the core 13 a spiral thread or groove 14b is cut in the outer surface 14a, the beginning of the thread being located opposite hole 13c. This hole communicates outwardly with a cooling or cryogenic inlet 19 that is adapted to be coupled to a source (not shown) of liquid $CO_2$ for example. The core 13 has its inner surface touching the spirally threaded portion 14b, thereby providing a helical conduit for flow of the coolant down the outside of the tube 14. Three transverse holes 13d, spaced at 120°, are drilled in the core enabling the coolant to escape through them.

Inside the reactor tube 14 there may be inserted a catalyst represented schematically in the drawings at the numeral 9 whose properties are to be analyzed with relation to different gaseous substances applied to the input of the tube 14, or in relation to different temperatures in it. The upper end 14c of the reactor tube 14 is adapted to be coupled at inlet 20 to one or more sources of selected gases including carrier gases, for example. These gases then flow through the tube 14 to its lower outlet end 14d to which an appropriate coupling may be attached.

The tube 14-core 13 sub-assembly is itself disposed within a slotted metallic tube 15 whose longitudinal slot 15a extends from its upper end to a point close to the lower end of core 13. Fixed along a portion of that slot is a narrow metallic tube 15b. This tube is partially disposed inwardly of the slot so that part comes into contact with the outer surface of core 13. Within tube 15b a second heat sensor or "RTD" 17 is inserted which may comprise, for example, a section of platinum resistance wire whose resistance is a function of temperature. This wire section may itself be incorporated in a bridge circuit of conventional design that produces, when connected to an appropriate electrical source, signals denoting changes in temperature and the direction of those changes. Protruding from the RTD sensor 17 are two leads 17a.

Wound around the slotted sleeve 15 is a heating coil 18 which makes contact with the outer surface of slotted tube 15 as well as a portion of the tube 15b which contains the RTD sensor 17. Coil 18 is also adapted to be connected to a control circuit (not shown) which may be coupled to a central data processing unit. The lower end of the sleeve 15 is an annular-shaped end cap 15c and the lower portion of tube 14 passes through its central opening with a small clearance. Just above cap 15c two diametrically opposed transverse apertures 15d are formed. When the cooling gas comes to the end of its spiral path in threads 14b, it will escape via holes 13d into the space between the outer surface of core 13 and the inner surface of slotted tube 15. Since little can escape via the end cap 15c, it will be guided upward around tube 15 and out through the top.

Figure 5:
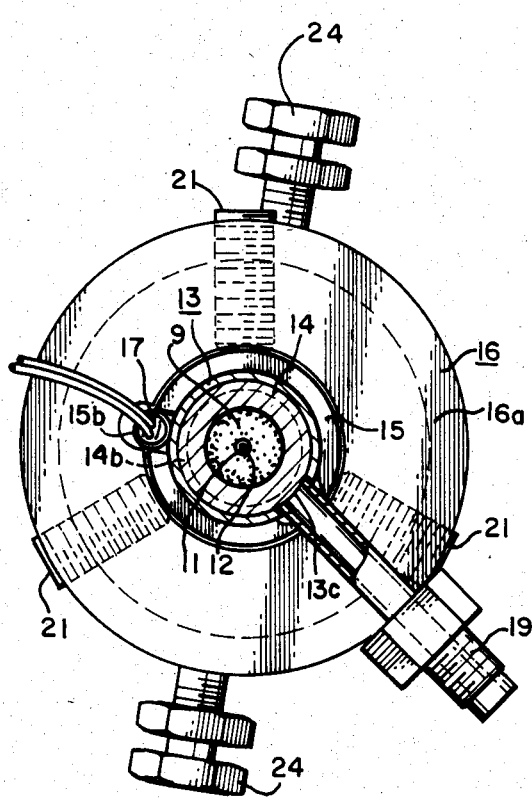
FIG. 5 is a view taken along the view-lines 5—5 of FIG. 3, partly sectional, in the direction indicated.
Figure 4:
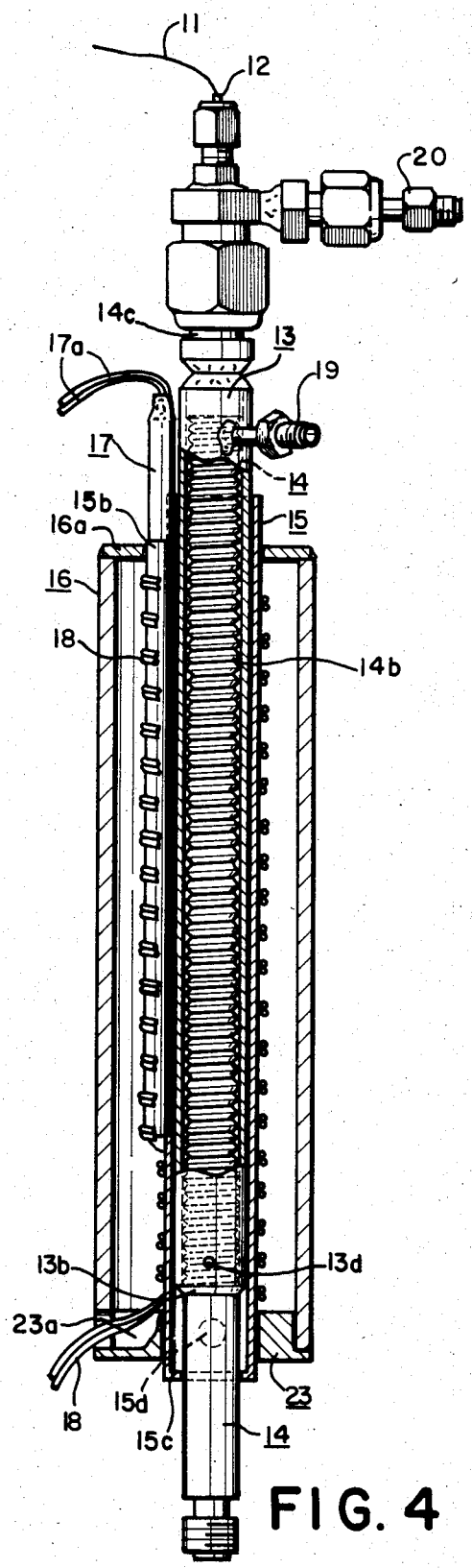
FIG. 4 is another side elevation view, partly sectional, which is broken-away differently to show further details of the inner construction.

To enclose and protect the heating coil 18, there is an outer, generally tubular housing member 16 having annular end caps 16a and 23. End cap 16a has a generally keyhole-shaped aperture to accommodate slotted tube 15. Tapped holes 15d permit end cap 23 to be secured to member 16. End cap 23 has a transverse aperture 23a through which the leads of coil 18 enter via slot 16b. Three screws 21 are screwed into transverse threaded apertures as shown in FIG. 5 until they touch and secure slotted tube 15 in place. Two screws 22 are screwed into respective threaded apertures toward the lower end of housing 16. Screws 22 may be Allen screws. Base plate 23 has axial passageways formed in it for lead openings.

In operation, substances such as gases to be reacted are applied through inlet fitting 20, possibly in an inert carrier gas, and proceed downward into the reactor tube 14 in which a catalyst 9 may be disposed. The interior of tube 14 has been heated by coil 18 (via tube 15, core 13 and reactor tube 14) to a desired temperature as measured by the thermocouple 11 disposed in axial tube 12. RTD sensor 17 also measures the temperature of the coil 18. As the heat builds up within the reactor tube 14, the thermocouple 11 transmits corresponding signals to the data processor. When and if the heat build-up in reactor tube 14, whether solely due to the effects of coil 18 or due to an exothermic reaction, exceeds a predetermined set point, the processor sends signals to appropriate valves that open to permit pulses of a coolant such as liquid carbon dioxide to be applied at the cooling or cryogenic inlet 19. That gas enters into the space between the outer surface 14a of the reactor tube 14 and the inner surface of the core 13. It is guided spirally downward by the threads or grooves 14c formed in surface 14a and exits from core 13 via the three holes 13d into the space between core 13 and slotted tube 15. Since the end cap 15c of the slotted tube 15 is tightly fitted around the reactor tube, a greater deal of the coolant issuing from holes 13d is forced upwardly between the inner surface of the slotted sleeve 15 and the outer surface of the core 13 and passes out the top into the atmosphere. Meanwhile, of course, the current applied to the heating coils 18 has been simultaneously cut off by the processor. The RTD 17 is meanwhile registering lower temperatures and sending signals to the data processing unit indicative thereof. The lowering of the temperature within the reactor 14 cools the tube 12 and the thermocouple 11 until the latter sends signals to the processing unit corresponding to the reestablishment of the set point temperature. Thereupon, the cooling operation is terminated and the coils are supplied with sufficient current to maintain that internal temperature.

The present invention, with its provision for a first temperature sensing means located right in the reactor tube itself, its low thermal-inertia core, and its external second temperature sensor which makes substantial heat-conductive contact with both the heating and cooling means, overcomes some of the advantages of the prior art. By having a core of low thermal inertia, the cooling and heating means can be effective much more quickly in case of a sudden burst of high temperature due, possibly, to an exothermic reaction within the reactor tube itself. Previous locations of the temperature sensors were such that there would be a large temperature gradient between the heating means and the interior of the reactor tube. Especially, if there was a core in-between which had a large thermal inertia, corrective cooling action could not be effected within a sufficiently short time to prevent damage to contents of the reactor tube, for example. Because the size of microreactors limits the total size of the apparatus, the present invention also effects significant savings in space by the provision of the cooling means as an integral part of, even though external to, the reactor tube.

What is claimed is:

1. Temperature-controlled microreactor apparatus comprising:
   (a) central container means for receiving substances under study, said container having an outer surface,
   (b) first sensing means within said container means for sensing the temperature therein,
   (c) means disposed outwardly of said container means and in heat-conductive relation to the outer surface of said container means for cooling said container means, said cooling means including a generally tubular core surrounding said container, said tubular core having two ends and means for circulating a coolant between said tubular core and said container,
   (d) means outwardly of said cooling means for heating the region of said outer surface of said container, and
   (e) second sensing means disposed in substantial contact with said core and also in substantial contact with said heating means for sensing the temperature in the region of the outer surface of said container and for sensing the temperature of said heating means.

2. The apparatus according to claim 1 wherein further comprising a tube provided with a longitudinal slot formed therein, said tube being substantially coaxial with said core and disposed outwardly thereof between said core and said heating means, wherein said second sensing means is disposed in said slot.

3. The microreactor apparatus according to claim 1 wherein said tubular core is sealed at both ends to the outer surface of said container and further wherein a spiral groove is formed in the outer surface of said container between the points where the two ends of said core are sealed to said container, and said coolant circulating means comprises an inlet aperture and an outlet aperture to enable introduction of a coolant at the beginning of said groove and its withdrawal therefrom at the ending thereof, respectively.

4. The microreactor apparatus according to claim 1 further comprising housing means spaced outwardly from and surrounding said core, said housing means including means to secure said housing means to said core.

5. The microreactor apparatus according to claim 1 wherein said central container means comprises a first heat-conductive tubular means and wherein said first sensing means is positioned inside said first tubular means for sensing temperature changes therein.

6. The microreactor apparatus according to claim 5 wherein said first sensing means comprises a second heat-conductive tubular means and means axially movable within said second tubular means for sensing temperature changes at selected points along the axis of said second tubular means.

7. The microreactor apparatus according to claim 1 wherein said cooling means comprises means for causing an introduced coolant to flow in a first lengthwise flow path on the outer surface of said container means in a helical pattern in a first direction.

8. The microreactor apparatus according to claim 7 wherein, at the end of said first lengthwise flow path, means are provided for causing said coolant to flow in a second lenthwise flow path and in a second direction generally opposite to said first direction.

* * * * *